United States Patent Office 3,217,461
Patented Nov. 16, 1965

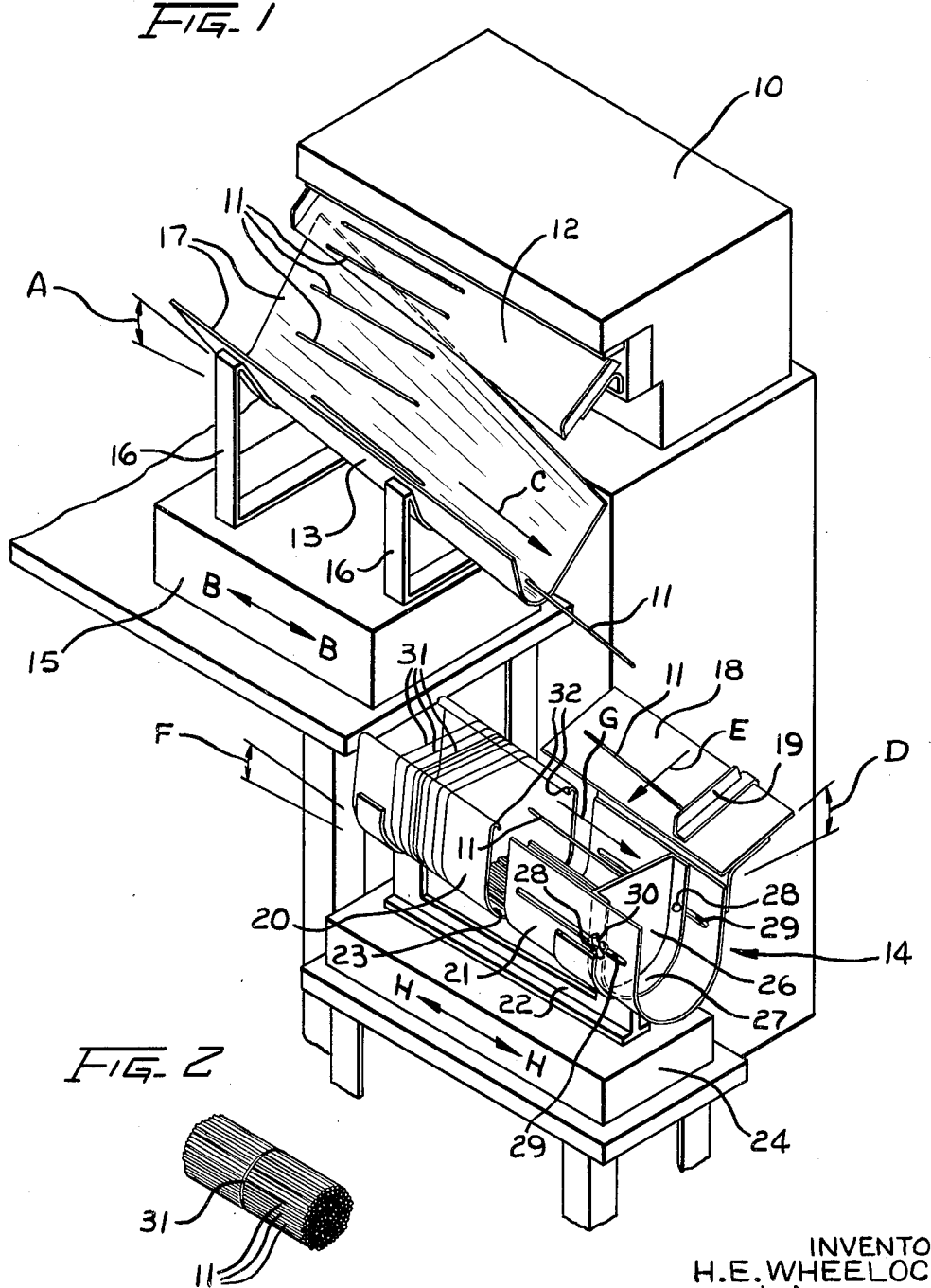

3,217,461
METHOD OF AND APPARATUS FOR PACK-
AGING LENGTHS OF FILAMENT
Harold E. Wheelock, Yutan, Nebr., assignor to Western
Electric Company, Incorporated, New York, N.Y., a
corporation of New York
Filed Sept. 26, 1962, Ser. No. 226,226
5 Claims. (Cl. 53—3)

The present invention relates generally to methods of and apparatus for packaging lengths of filament, and more particularly for packaging short lengths of wire being continuously fed one at a time. The general objects of the invention are to provide new and improved methods and apparatus of such character.

There are many problems associated with packaging lengths of filament, particularly semi-flexible lengths of wire. The problem which immediately arises is how to collect such filament lengths so that they do not aggregate in a disarranged mass, staggered and oblique in relation to each other, but rather congregate in a uniform bunch. A second and almost axiomatic problem involves determining the simplest and most efficient technique of packaging such uniform bunches into compact bundles. A corollary to the second problem is the compatibility of the resulting package with the handling requirements in utilizing the filament lengths for their intended purpose. Also of significance is the problem of designing a packaging device which is readily adaptable to accommodate varied lengths of filament. A wide variety of ingenious techniques and complex devices have been devised in an attempt to remedy such problems in the automatic packaging of lengths of filament, but no known device facilitates the bundling of such elements at their midpoints with a simple rubber band.

Therefore, more specific objects of the invention are to provide new and improved methods of and apparatus for packaging lengths of filament wherein the lengths are collected in a uniform bunch and bound at their midpoints very simply and efficiently with a rubber band to form a compact bundle, compatible with the most stringent handling requirements.

The foregoing and other objects are accomplished in accordance with the invention by collecting aligned lengths of filament in a hopper composed of two sections separated by a slot perpendicular to the aligned filament lengths. When a desired number of lengths has been collected, a stretched rubber band encircling one of the hopper sections is slid from a remote position, wherein it does not interfere with the collecting operation, to the slot and is released, whereby it grips and holds the filament lengths in a compact bundle.

In accordance with a specific embodiment of the invention the collecting hopper is inclined and generally U-shaped, and is vibrated so that the filament lengths uniformly congregate with one end of each against a flat movable end wall of the hopper defining the bottom of the incline. In addition, the distance between the movable end wall and the slot is adjusted so that the midpoints of the filament lengths overlie the slot.

In accordance with a preferred application of the present invention, the specific embodiment is utilized in combination with apparatus for cutting a continuous length of wire into short lengths and stripping the insulation from the terminal ends thereof. In such an application the specific embodiment is further provided with an inclined, generally V-shaped, vibratory chute for receiving the short lengths of wire as they are ejected from the cutting and stripping apparatus. A slanted deflector plate, mounted at the end of the chute so that it is coextensive with and above the collecting hopper, receives the wire lengths from the chute and causes them to fall laterally of their length into the collecting hopper.

Other objects, advantages and aspects of the invention will appear from the following detailed description of a specific embodiment thereof when taken in conjunction with the appended drawings in which:

FIG. 1 is a perspective view of a preferred embodiment of the invention in combination with a specific application thereof with a wire cutting and stripping machine; and FIG. 2 is a perspective view of the wire lengths uniformly held at their midpoints by a rubber band in a compact bundle.

For purposes of clarity and understanding, a general description will be given at the outset of apparatus with which the preferred embodiment of the invention can be utilized. The apparatus contemplated includes any machine 10 wherein a continuous length of wire is cut into short lengths 11—11 which are stripped of insulation at their terminal ends and continuously fed one at a time down an exit chute 12. One such machine is known commercially as an Artos machine and is described in detail in U.S. Patent No. 1,787,658 issued to K. H. Andren et al.

In adapting the preferred embodiment of the invention to such a machine, a generally V-shaped chute 13 is provided for receiving the resulting wire lengths 11—11 and feeding them into a hopper designated generally by the numeral 14. The chute 13 is mounted on a vibratory table 15 by a pair of brackets 16—16 at an angle A relative to the horizon. Thus, the wire lengths 11—11 ejected from the machine 10 are fed along the chute 13 by the combined action of vibrations induced by the vibratory table 15 in the direction B—B, and gravity as a result of the angular disposition of the chute 13. Such combined action, together with the V-shaped configuration defined by the walls 17—17 of the chute, cause the wire lengths to slide lengthwise along the chute toward the bottom of the incline in the direction indicated by the arrow C.

The wire lengths 11—11 leaving the chute 13 are then permitted to fall onto a deflector plate 18 which guides them into the hopper 14 so that they are collected in a uniform bunch. The deflector plate 18 is disposed at the end of the chute 13, and is coextensive with and above an edge of the collecting hopper 14. The deflector plate is slanted at an angle D relative to the horizon so that wire lengths 11—11 falling thereon engage a guide 19 and fall laterally of their length, in the direction indicated by the arrow E. The wire lengths are thereby constrained to fall into the hopper 14 substantially parallel to each other, and are maintained at this attitude by the slope of a curved hopper bottom. As an additional feature of flexibility, the guide 19 is mounted transversely of the deflector plate 18 for adjustable movement longitudinally therealong to accommodate various lengths of wire.

The hopper 14 is generally U-shaped in configuration and is disposed at an angle F relative to the horizon. It is composed of two distinct sections, an upper and a lower section 20 and 21, respectively, each of which is individually supported at its remote end by a standard 22 so that it is spaced from the other to form a slot 23 in a plane perpendicular to the aligned wire lengths 11—11. Wire lengths 11—11 received in the hopper 14 are forced to slide along the incline in the direction G by vibratory movement of the hopper in the direction H—H, induced by a vibratory table 24 supporting the standard 22. Thus, the collected wire lengths are forced by the U-shaped configuration of the hopper 14 and the vibration thereof to congregate in a uniform bunch with an end of each abutting a flat end wall 26 in the lower section 21.

The end wall 26 is mounted for movement along the length of the lower hopper section 21 by a pair of bolts 28—28 which are received in elongated slots 29—29. In order to help maintain proper orientation during such movement, the end wall is provided with a peripheral edge 27 of mating contour with respect to the hopper section. The end wall 26 can thus be adjusted to a position where the midpoints of the collected wire lengths overlie the slot 23, and can be secured in this position by tightening a wing-nut 30 on each bolt 28.

After a selected number of wire lengths 11—11 have been collected, a stretched rubber band 31 encircling the uppermost hopper section 20 is slid to the slot 23 and is released so that it grips and holds the wire lengths uniformly at their midpoints in a compact bundle, as shown in FIG. 2. To reduce the possibility of rupturing the stretched rubber band during such sliding movement, the upper edges of the uppermost hopper section 20 are rounded so that no sharp edges are presented to the rubber band as it slides therealong.

In order to further automatize the packaging operation, a plurality of rubber bands 31—31 are placed on the upper hopper section 20 prior to the packaging operation. This is accomplished by passing one end of the rubber bands through the slot 23 and encircling the upper hopper section 20 therewith, after which they are slid along that section to a remote position where they will not interfere with the collection operation.

To permit such placement of the rubber bands 31—31, it is obvious that the upper hopper section 20 must be free of any obstructions which would interfere with above-described movements. For this reason, the upper hopper section is supported at its remote end only, and the deflector plate 18 is spaced from the upper hopper section either by mounting it at the edge of the lower hopper section 21, as shown in FIG. 1, or at the end of the chute 13 (not shown). Thus, by placing a plurality of rubber bands 31—31 on the upper hopper section at one time, several bundles can be packaged without interruption.

To enable more efficient loading of the rubber bands, the rubber bands can be preloaded on a sleeve or magazine (not shown) of mating configuration with respect to the upper hopper section 20. The length of such a sleeve must necessarily be small, with respect to the length of the hopper, so as not to interfere with the collecting operation, but can be of sufficient size to accommodate an adequate number of rubber bands to permit, for example, uninterrupted operation of an Artos machine for a full day without reloading. So that the sleeve can readily be inserted over the upper hopper section 20, the lower section 21 may be slidably or pivotably mounted at its remote end to the standard 22 to facilitate its movement away from the upper section 20.

*Operation*

To reiterate the fundamental steps of the packaging operation, a plurality of the stretched rubber bands 31—31 are initially placed on the upper hopper section 20. Operation of the cutting and stripping machine is then initiated, and ejected wire lengths 11—11, fed along the chute 13 and the deflector plate 18, are collected in the hopper 14. The hopper is vibrated so that the collected wire lengths congregate uniformly against the flat, movable end wall 26 which is adjusted relative to the slot 23 such that the midpoints of the wire lengths overlie the slot. After a desired number of wire lengths have been collected, one of the stretched rubber bands 31—31 is slid to the slot 23 and released so that it grips and holds the lengths uniformly at their midpoints in a compact bundle. The bundle is then removed from the hopper so that successive groups can be continuously packaged.

While one specific embodiment of the invention has been described in detail hereinabove, it will be obvious that various modifications can be made without departing from the spirit and scope of the invention.

What is claimed is:

1. A method of packaging lengths of filament, which comprises the steps of:
    collecting the filament lengths in an inclined hopper having two sections separated by a slot,
    vibrating the hopper so that the filament lengths uniformly congregate with one end of each against an end wall of the hopper defining the bottom of the incline,
    sliding a stretched rubber band encircling one of the hopper sections from a remote end thereof, wherein it does not interfere with the collecting of filament lengths, to the slot after a desired number of filament lengths has been collected, and
    releasing the rubber band so that it grips and holds the collected filament lengths uniformly in a compact bundle.

2. A method of packaging short lengths of wire being continuously fed one at a time, which comprises the steps of:
    collecting the wire lengths in an inclined hopper having two sections separated by a slot,
    vibrating the hopper so that the wire lengths uniformly congregate with one end of each against a flat, movable end wall of the hopper defining the bottom of the incline, the end wall being adjusted such that the midpoints of the wire lengths overlie the slot,
    sliding a stretched rubber band encircling one of the hopper sections from a remote end thereof, wherein it does not interfere with the collecting of wire lengths, to the slot after a desired number of wire lengths has been collected, and
    releasing the rubber band so that it grips and holds the collected wire lengths uniformly at their midpoints in a compact bundle.

3. Apparatus for packaging short lengths of wire being continuously fed one at a time, which comprises, an inclined, generally U-shaped, vibratory collecting hopper for receiving lengths of wire, said hopper defining a slot which divides the hopper into two separate sections along a plane perpendicular to the wire lengths, the sloping bottom of said hopper causing the wire lengths to align themselves relative to each other, and said hopper having a flat, movable end wall which is adjusted so that the wire lengths congregate with one end thereagainst and with their midpoints overlying the slot; whereby one of a plurality of stretched rubber bands encircling one of the hopper sections may be moved from a remote position, wherein it does not interfere with the collecting operation, to the slot and allowed to contract about the wire lengths to hold them uniformly in a compact bundle.

4. In combination with apparatus for cutting a continuous length of wire into short lengths and stripping the insulation from the terminal ends thereof, apparatus for packaging the short lengths of wire as they are continuously fed one at a time from the cutting and stripping apparatus, which packaging apparatus comprises, an inclined, generally V-shaped, vibratory chute for receiving the short lengths of wire as they are ejected from the cutting and stripping apparatus; an inclined, generally U-shaped, vibratory collecting hopper defining a slot which divides the hopper into an upper and a lower section in a plane perpendicular to aligned wire lengths collected therein, said hopper having a flat, movable end section in the lower section thereof; and a slanted deflector plate mounted at the end of said chute, coextensive with and above said collecting hopper, so that wire lengths received from said chute fall by gravity laterally of their length along said slanted deflector plate into said collecting hopper, the movable end section in the lower hopper section being adjusted so that the wire lengths congregate with one end of each thereagainst with their midpoints overlying the slot; whereby one of a plurality of stretched rubber bands encircling one of the hopper sections may be moved from a remote position, wherein it does not interfere with the collecting operation, to the slot and allowed to contract about the wire lengths to hold them uniformly in a compact bundle.

5. Apparatus for packaging lengths of filament which comprises, a longitudinally inclined collecting hopper for receiving filament lengths, said hopper having a sloping bottom so that the filament lengths tend to align themselves with each other as they are received in said hopper and said hopper defining a slot which divides the hopper into two separate sections along a plane generally perpendicular to the aligned filament lengths; and means for vibrating said collecting hopper, said hopper having a flat end wall in the lower section thereof against which the collected filament lengths congregate in a uniform bunch as said hopper is vibrated, whereby a stretched rubber band encircling one of the hopper sections may be moved from a remote position, wherein it does not interfere with the collecting operation, to the slot and allowed to contract about the filament lengths to hold them in a compact bundle.

References Cited by the Examiner
UNITED STATES PATENTS

| | | | |
|---|---|---|---|
| 28,753 | 6/1860 | Hobe | 100—6 X |
| 1,508,258 | 9/1924 | Sikma | 100—9 |
| 2,549,322 | 4/1951 | McKinsey | 53—126 |
| 2,599,290 | 6/1952 | Schwenzer | 100—1 |
| 2,945,336 | 7/1960 | Anderson et al. | 53—198 |

FOREIGN PATENTS 447,445  5/1936  Great Britain.

FRANK E. BAILEY, *Primary Examiner.*

TRAVIS S. McGEHEE, *Examiner.*